(12) United States Patent
Tran et al.

(10) Patent No.: US 8,966,229 B2
(45) Date of Patent: *Feb. 24, 2015

(54) SYSTEMS AND METHODS FOR HANDLING INSTRUCTIONS OF IN-ORDER AND OUT-OF-ORDER EXECUTION QUEUES

(75) Inventors: Thang M. Tran, Austin, TX (US); Trinh Huy H. Nguyen, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 699 days.

This patent is subject to a terminal disclaimer.

(21) Appl. No.: 13/212,420

(22) Filed: Aug. 18, 2011

(65) Prior Publication Data

US 2013/0046957 A1    Feb. 21, 2013

Related U.S. Application Data

(63) Continuation of application No. 13/210,566, filed on Aug. 16, 2011.

(51) Int. Cl.
*G06F 9/30* (2006.01)
*G06F 9/38* (2006.01)

(52) U.S. Cl.
CPC .......... *G06F 9/30087* (2013.01); *G06F 9/3814* (2013.01); *G06F 9/3824* (2013.01); *G06F 9/3838* (2013.01); *G06F 9/3851* (2013.01); *G06F 9/3891* (2013.01)
USPC .......................................... 712/216; 712/214

(58) Field of Classification Search
USPC ................................... 712/216, 217
See application file for complete search history.

(56) References Cited

U.S. PATENT DOCUMENTS 6,112,019 A * 8/2000 Chamdani et al. ............ 712/214
6,308,260 B1 * 10/2001 Le et al. ......................... 712/215
(Continued)

OTHER PUBLICATIONS

Hennessy, "Computer Architecture a Quantitiave Approach", 1996, 2nd Edition, pp. 187-194 and 251-261.*
(Continued)

*Primary Examiner* — Andrew Caldwell
*Assistant Examiner* — Yuqing Xiao

(57) ABSTRACT

Processing systems and methods are disclosed that can include an instruction unit which provides instructions for execution by the processor; a decode/issue unit which decodes instructions received from the instruction unit and issues the instructions; and a plurality of execution queues coupled to the decode/issue unit, wherein each issued instruction from the decode/issue unit can be stored into an entry of at least one queue of the plurality of execution queues. The plurality of queues can comprise an independent execution queue, a dependent execution queue, and a plurality of execution units coupled to receive instructions for execution from the plurality of execution queues. The plurality of execution units can comprise a first execution unit, coupled to receive instructions from the dependent execution queue and the independent execution queue which have been selected for execution. When a multi-cycle instruction at a bottom entry of the dependent execution queue is selected for execution, it may not be removed from the dependent execution queue until a result is received from the first execution unit. When a multi-cycle instruction at a bottom entry of the independent execution queue is selected for execution, it can be removed from the independent execution queue without waiting to receive a result from the first execution unit.

19 Claims, 8 Drawing Sheets

(56) References Cited

U.S. PATENT DOCUMENTS

| | | | |
|---|---|---|---|
| 6,385,715 B1 * | 5/2002 | Merchant et al. | 712/219 |
| 6,553,484 B1 * | 4/2003 | Sawamura | 712/217 |
| 6,931,641 B1 | 8/2005 | Davis et al. | |
| 2004/0003309 A1 * | 1/2004 | Cai et al. | 713/320 |
| 2004/0215932 A1 | 10/2004 | Burky et al. | |
| 2004/0216101 A1 | 10/2004 | Burkey et al. | |
| 2012/0221835 A1 | 8/2012 | Tran | |

OTHER PUBLICATIONS

Smotherman, M., "Eager Execution/Dual Path/Multiple Path", http://www.cs.clemson.edu/~mark/eager.html, Jul. 2010, pp. 1-9.

U.S. Appl. No. 13/210,566, Office Action—Rejection, mailed May 27, 2014, pp. 1-39.

U.S. Appl. No. 13/210,566, Office Action—Rejection, dated Oct. 16, 2014, pp. 1-34.

\* cited by examiner

SYSTEMS AND METHODS FOR HANDLING INSTRUCTIONS OF IN-ORDER AND OUT-OF-ORDER EXECUTION QUEUES

BACKGROUND

1. Field

This disclosure relates generally to computer processor architecture, and more specifically, to configuring a computer processor for handling instructions with multiple dependencies.

2. Related Art

One goal of ongoing processor development is to increase the number of instructions per cycle (IPC). A computer processor's IPC is typically limited by stalling of instructions in queues due to the inability to access memory when instructions are executed in-order. Issuing instructions out-of-order can help to a certain degree, but eventually stalled instructions will block other independent instructions from execution as out-of-order dependent instructions fill up the queue.

Further, there is ever-increasing pressure to reduce power consumption in computer processor devices to conserve available power and extend the operating life of portable devices between re-charging cycles.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
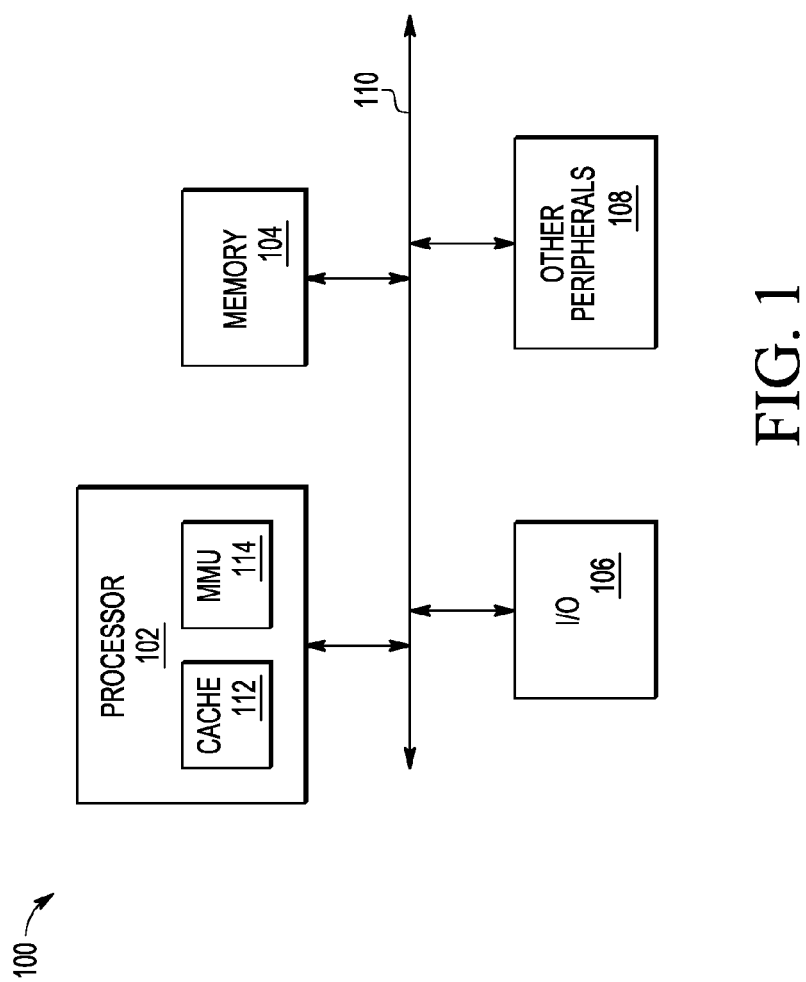
FIG. 1 is a diagram of an embodiment of a computer processing system in accordance with the present disclosure.

FIG. 1 shows a computer processing system 100 in which instruction decode and issue for latency tolerance execution can be implemented according to some embodiments of the disclosure. System 100 can be a superscalar microprocessor architecture in which instructions are issued in order to execution queues and instructions in each execution queue are executed in order but the instructions from different execution queues can execute out-of-order for latency tolerant execution. Complex instructions, such as load/store, integer multiply (IMUL), integer division (IDIV), floating point, and single instruction multiple data (SIMD) instructions, can have their own execution queues including an independent and a dependent complex instruction execution queue for complex instructions. As used herein, the term "complex instruction" refers to an instruction that takes more than one processor cycle to execute. When a complex instruction is dependent on the result of another instruction, a synchronization indicator, such as a specified instruction, can be inserted in the execution queue that depends on the result from the other execution queue. "Executing" the synchronization indicator results in a signal being sent to the other execution queue to enable the execution of dependent instruction. The result data can be read from a register file instead of forwarding result data between execution units and load store unit/data cache unit.

The dependent complex integer execution queue can have higher execution priority than the independent complex integer execution queue. If there is a valid instruction in the dependent complex integer execution queue, then the complex instruction can be sent to both the dependent and independent complex integer execution queues. The complex instruction in the independent complex integer execution queue can be removed once selected for execution while the complex instruction in the dependent complex integer execution queue can remain until execution is completed. At this time, data can be forwarded to the dependent instruction in the dependent complex integer execution queue.

In the illustrated embodiment, components in computer processing system 100 include processor 102, memory 104, input/output (I/O) handlers/interfaces 106, and other peripheral devices or modules 108 which are bi-directionally coupled to bus 110 to allow communication between components. Processor 102 includes Level 1 cache memory units 112 and memory management unit (MMU) 114.

Bus 110 may communicate external to computer processing system 100. Alternate embodiments of the present disclosure may use more, less, or different components and functional blocks that those illustrated in FIG. 1. As some possible examples, alternate embodiments of computer processing system 100 may include a timer, a serial peripheral interface, a digital-to-analog converter, an analog-to digital converter, a driver (e.g. a liquid crystal display driver), and/or a plurality of types of memory.

MMU 114 is capable of providing various cache memory and bus control signals high-speed as well as virtual address to physical address translation. The virtual address is an address that is generated by processor 102 and as viewed by code that is executed by processor 102. The physical address is used to access the various higher-level memory banks such as a level-one RAM memory. Once processor 102 requests data from memory, MMU 114 can send a task identifier associated to the data request (or more generally to the task that is being executed by processor 102) to memory 104 and also to data cache internal to processor 102.

In alternate embodiments, computer processing system 100 may include one, two, or any number of processors 102. If a plurality of processors 102 are used in computer processing system 100, any number of them may be the same, or may be different. Note that although computer processing system 100 may have a plurality of processors 102, a single processor 102 which by itself can execute a plurality of instruction sets.

Memory module 104 can include a multi-level cache architecture including one or more levels of instruction cache and data cache module that have slower access rates than Level 1 cache modules 112. Memory 104 can also include an external memory that is also referred to as a main memory and can optionally include additional devices such as buffers and the like.

Figure 2:
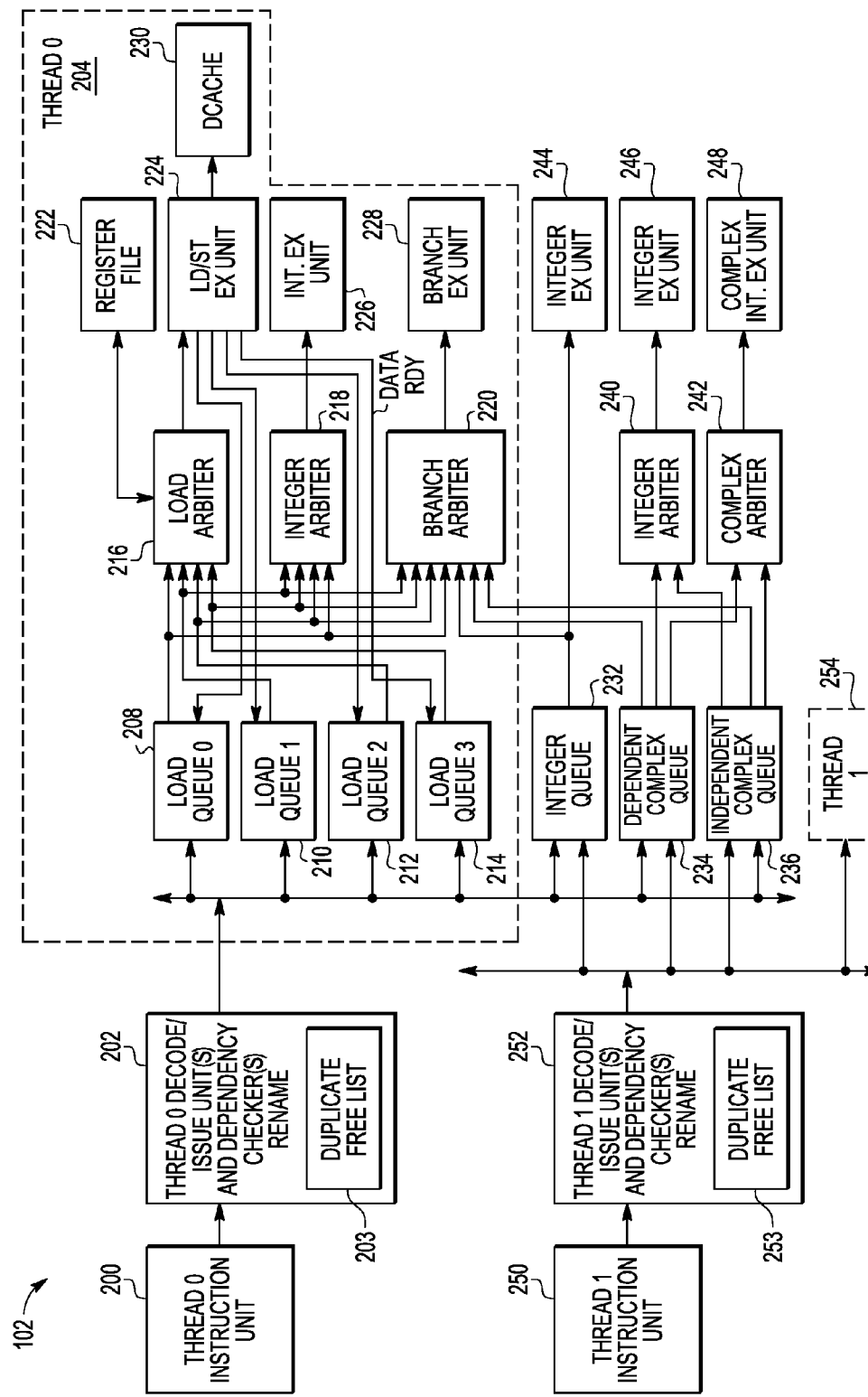
FIG. 2 is a diagram of an embodiment of instruction handling components that can be included in the computer processor of FIG. 1.

FIG. 2 is a diagram of an embodiment of instruction handling components that can be included in computer processor 102 of FIG. 1 with latency tolerance execution of one or more program threads (e.g., Thread0 and Thread1). Thread0 and Thread1 instruction units 200, 250 implement instruction queues configured to provide program instructions to respective decode/issue units 202, 252. Decode/issue units 202, 252 can include logic to multiplex valid instructions, decode instructions for instruction type, source, and destination operands, generate queue entries and tags for instructions, rename instruction operands to a latest register mapping, determine source and destination register dependencies between decoded instructions, check dependency with previous instructions in execution queues, and separate complex instructions into micro-instructions. Decode/issue units 202, 252 also include a duplicate instruction handler that generates respective duplicate free lists 203, 253 to indicate whether an instruction being issued to one of queues 208-214, 232, 234, 236 is a duplicate of an instruction being issued to another one or more of queues 208-214, 234, 236 during the same processor clock cycle. For example, duplicate free lists 203, 253 can include a number of bits, with each bit being used to represent whether a corresponding execution queue 208-214, 232, 234, 236 is free of instructions that are duplicated in another one of queues 208-214, 232, 234, 236.

Decode/issue units 202, 252 issue instructions to execution queues, and update register renaming for issued instructions. In the embodiment shown, a group of components 204 in processor 102 allocated to Thread0 includes load queues 208, 210, 212, 214, integer queue 232, and dependent and independent complex integer execution queues 234, 236. Another group of components 254 in processor 102 allocated to Thread1 includes a separate set of load queues 208-214, while integer queue 232 and dependent and independent complex integer execution queues 234, 236 can be shared with Thread0.

Note that although the architecture shows components for Thread0 and Thread1, additional program threads can be executed by processor 102. For example, although not labeled in FIG. 2, the components allocated for Thread0 may be used to execute Thread0 and a Thread2 while components allocated for Thread1 may be used to execute Thread1 and a Thread3. Further, processor 102 may use components for Thread0 and Thread1 to process a greater number of instructions per cycle while executing only one thread at a time. Components that can be duplicated to support multi-threading are shown within a dashed box 204 in FIG. 2 that includes load queues 208-214, load arbiter 216, integer arbiter 218, branch arbiter 220, register file 222, load/store unit 224, integer execution unit 226, branch execution unit 228, and data cache 230.

Processor 102 can further schedule execution of instructions using load arbiter 216, one or more integer arbiters 218, 240, branch arbiter 220, and complex arbiter 242. Load arbiter 216 and integer arbiter 218 can arbitrate execution of load/store and integer instructions in load queues 208-214. Branch arbiter 220 can arbitrate execution of branch instructions in load queues 208-214 as well as integer instructions in integer queue 232 and dependent and independent complex integer execution queues 234, 236. Integer arbiter 240 and complex arbiter 242 can each arbitrate integer instructions from dependent and independent complex integer execution queues 234, 236.

Microprocessors that require instructions to be executed in-order experience long delays when data required to execute the instruction is not found in cache memory, i.e., a cache miss occurs. Further, instructions that depend on one another may fill the execution queue and block the execution of independent instructions. Microprocessors that allow out-of-order execution include a replay queue for instructions that experience a data cache miss and constantly check for availability of source operands in order to execute instructions. In contrast, processor 102 includes multiple load queues 208-214 to hold the dependent instructions that experience a cache miss in the same queue until completion instead of replaying or re-issuing instructions while independent instructions are free to issue from other execution queues. Additionally, when an instruction issues, since the instructions in queues 208-214 can be in-order, data for source operands will be available from result forwarding or from register file 222. In many cases, it is possible to statistically determine when data for the source operands of an instruction will be available and schedule accordingly. However, in some cases, such as Level-1 data cache misses, the data may not be available as expected. In cases where instructions are dependent on two load instructions, the dependent instructions can be sent to two different queues 208-214. The dependent instruction in one of queues 208-214 will then be invalidated when the copy of the instruction reaches the head of another of queues 208-214.

In single thread mode, processor 102 can concurrently send two instructions to decode/issue unit 202 and one instruction to decode/issue unit 252 resulting in execution of three instructions per cycle. In multi-thread mode, two threads can concurrently send two instructions each to decode/issue units 202, 252 resulting in execution of two instructions per cycle per thread. Decode/issue units 202, 252 can also handle issuing serialized instructions such as instruction exceptions (e.g., Translation Look-aside Buffer miss, breakpoint, and illegal instruction), software interrupts (SWI), and instructions that modify processor configuration and states.

Load arbiter 216 sends instructions to load/store unit 224. Integer arbiter 218 sends instructions to integer execution unit 226. Branch arbiter 220 sends instructions to branch execution unit 228. Integer queue 232 sends instructions to integer execution unit 244. Integer arbiter 240 sends instructions to integer execution unit 246, and complex arbiter 242 sends instructions to complex integer execution unit 248. Note that integer arbiters 218 and 240 can be combined into one arbiter that receives instructions from load queues 208-214 and dependent and independent complex integer execution queues 234, 236, and send instructions to integer execution unit 226.

Load instructions from load queues 208-214 dispatch to load/store unit 224 and will remain in a respective queue until data is returned in the next clock cycle, effectively blocking all dependent instructions until valid data is returned in the next clock cycle. Load/store unit 224 can send data ready signals to load queues 208-214 when a cache hit is detected from data cache 230. The bottom entries of load queues 208-214 can send an entry or tag that includes time stamp information to load arbiter 216. The time stamp information allows load arbiter 216 to determine and send the oldest instruction to load/store unit 224. Alternatively, load/store arbiter 216 can receive and send instructions on a round robin basis, where the first instruction that reaches arbiter 216 is the first instruction sent to load/store unit 224. The round robin basis is matched by decode/issue units 202, 252 for issuing independent load/store instructions to load queues 208-214.

Figure 3:
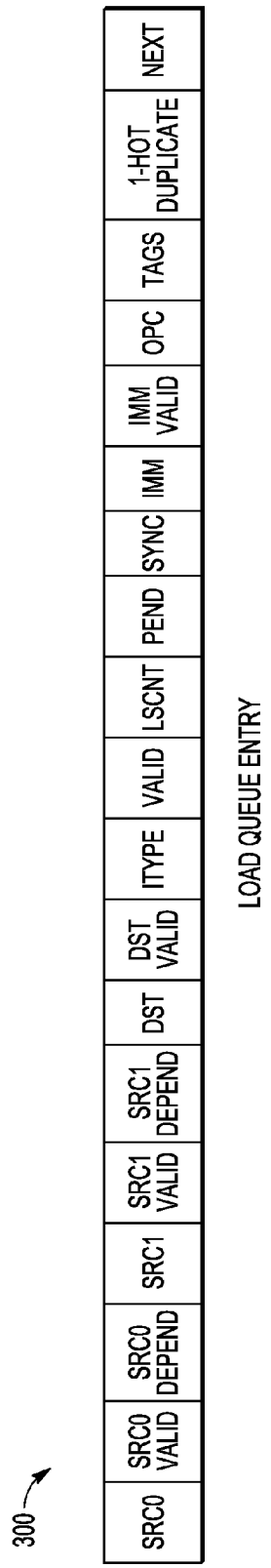
FIG. 3 is a diagram of an embodiment of an execution queue entry in the computer processor of FIG. 2.

FIG. 3 is a diagram of an embodiment of a load/store execution queue entry 300 that can be used in the computer processor of FIG. 2 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | Instruction is pending execution under one of the following conditions: 1. Result Pending: instruction has been sent to load/store execution unit or complex integer execution unit and is waiting for result data that will be ready in the next clock cycle 2. Sync Pending (2 bits): instruction is waiting for results from other execution queues. Example, load instruction is waiting for results from simple execution queue and complex execution queue. |
| SYNC | dummy instruction used to clear Sync Pending indicator in another queue. |
| IMM | Immediate Data from instruction |
| IMM_VALID | Immediate Data is valid |
| OPC | Decoded opcode field and/or control bits for execution units |
| TAGS | Tags for keeping track of instruction ordering during execution: CPTAG: checkpoint tag for all instructions. The checkpoint tag is incremented only for branch and load instructions; SYNCTAG: sync tag. For SYNC entry in the execution queue, this tag points to the instruction in another execution queue including the execution queue number and the entry number in the queue. |
| 1-HOT | bit fields used to indicate whether a queue includes an instruction that is |
| DUPLICATE | duplicated in another queue |
| NEXT | indicator that next instruction in the queue is to be invalidated due to duplicate instruction in another queue |

Figure 4:
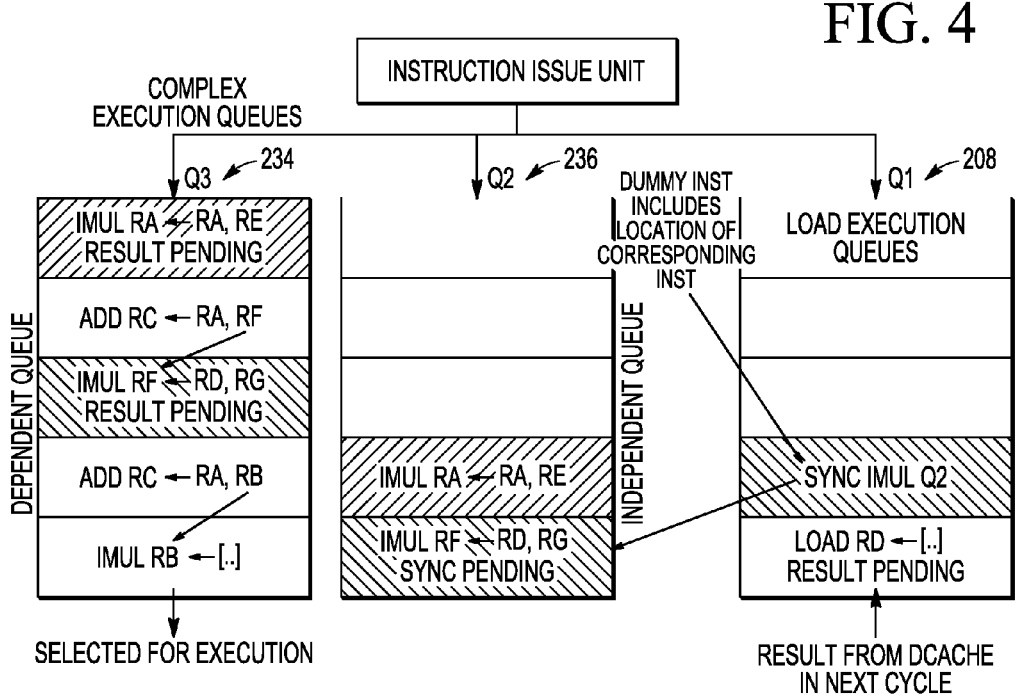
FIG. 4 is an example of instruction handling in execution queues in the computer processor of FIG. 2.
Figure 5:
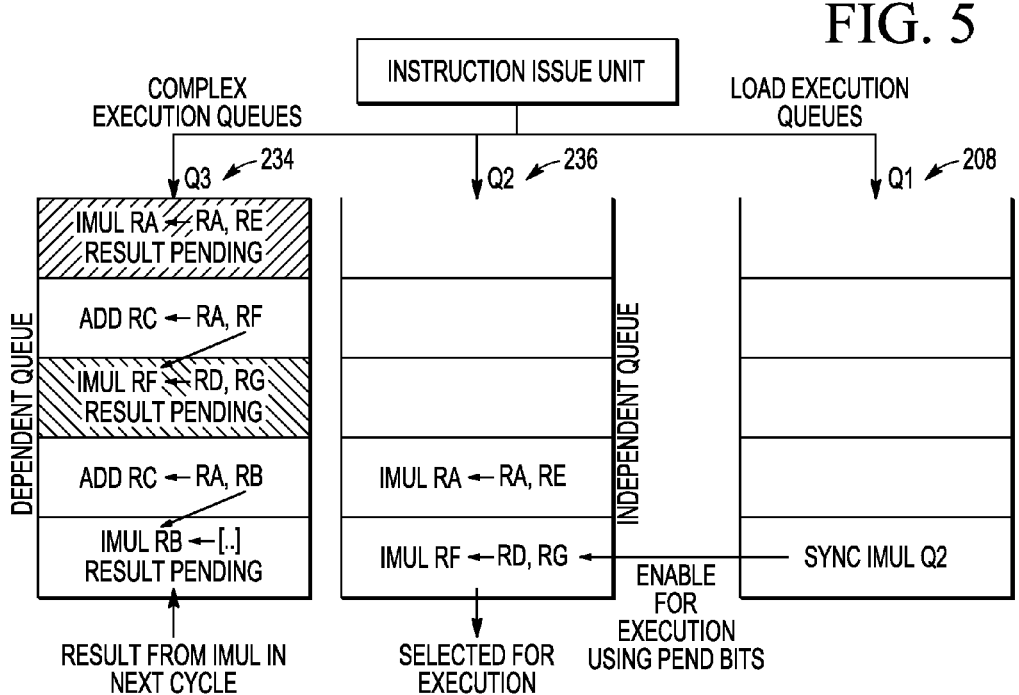
FIG. 5 shows subsequent instruction handling in execution queues of FIG. 4.
Figure 6:
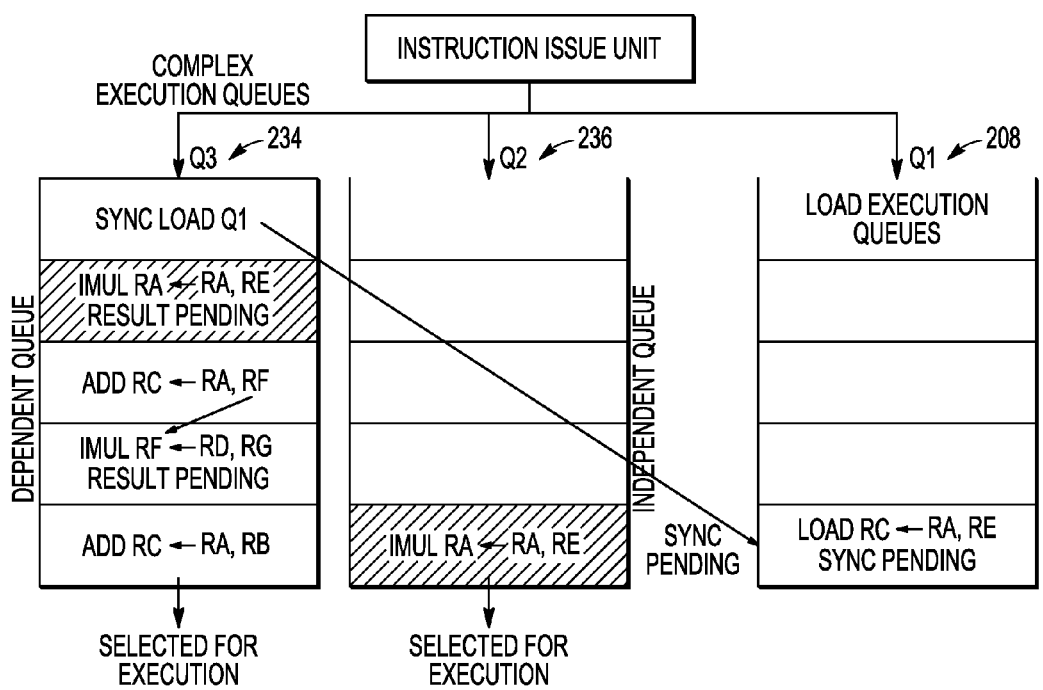
FIG. 6 shows subsequent instruction handling in execution queues of FIG. 5.

FIGS. 4, 5, and 6 show an example of instruction handling in load/store execution queue 208, dependent complex integer execution queue 234, and independent complex integer execution queue 236 using indicators of queue entry 300 in FIG. 3. Referring to FIGS. 2 and 4, FIG. 4 shows a number of complex and non-complex instructions in queues 208, 234, and 236 including a first non-complex instruction (Load RD ←[. .]) in the bottom entry of load/store execution queue 208. The result for the Load instruction in the bottom entry of load/store execution queue 208 is due from the data cache in the next processor cycle.

Dependent complex integer execution queue 234 includes a first complex instruction (IMUL←RB [. .]) in the bottom entry and a non-complex instruction (Add RC←RA, RB) in the second to last entry with an operand that depends on the result of the first complex instruction. The first complex instruction has been selected for execution.

A second complex instruction (IMUL RF←RD, RG) was also received that depends on the result (RD) of the Load instruction. Since the dependent complex integer execution queue 234 was not empty when the second complex instruction was received, the second complex instruction is saved to both the dependent and independent complex instruction execution queues 234, 236. Processor 102 sets a Result Pending indicator for the second complex instruction entry in the dependent complex instruction execution queue 234. Processor 102 also saves or inserts a SYNC instruction or indicator in the load/store queue 208 with SYNCTAG (FIG. 3) that indicates the location (queue) and queue entry number of the second complex instruction in the independent queue 236. Additionally, a SYNC Pending indicator is saved in the entry for the second complex instruction in the independent complex integer execution queue 236.

Dependent complex integer execution queue 234 further received a second non-complex instruction (Add RC←RA, RF) that is placed in the queue after the second complex instruction, since an operand (RF) for the second non-complex instruction depends on the result of the second complex instruction.

A third complex instruction (IMUL RA←RA, RE) was received whose operands do not depend on another instruction. Since the dependent complex integer execution queue 234 is not empty, the third complex instruction is saved in both the dependent and the independent complex instruction execution queues 234, 236. A Result Pending indicator is set for the third complex instruction's entry in the dependent complex instruction execution queue 234.

Subsequent to FIG. 4, FIG. 5 shows an example of the instructions in queues 208, 234, and 236 after the next processor cycle. The previous Load instruction at the bottom of load/store execution queue 208 has been removed and the SYNC instruction with SYNC tag is now at the bottom entry of load/store execution queue 208. The first instruction and the SYNC instruction clear the SYNC Pending indicator in the second complex instruction (IMUL RF←RD, RG) in execution queue 236 so processor 102 enables the corresponding second complex instruction for execution using the Sync Pending indicator in the instruction's queue entry, as specified. Since the second complex instruction is now at the bottom of independent complex instruction execution queue 236, processor 102 selects the second complex instruction for execution.

The Result Pending indicator is set for the first complex instruction (IMUL←RB [. .]) in the bottom entry of the dependent complex integer execution queue 234 as the instruction awaits the result in the next processor cycle. The remaining instructions in queues 236, 234 are the same as in FIG. 4.

Following FIG. 5, FIG. 6 shows an example of the instructions in queues 208, 234, and 236 after the next processor cycle. The first and second complex instructions at the bottom of respective queues 234, 236 have been invalidated and the entries in the queues 234, 236 have shifted down by one entry. The third complex instruction (IMUL RA←RA, RE) at the bottom of queue 236 and non-complex instruction (Add RC←RA, RB) at the bottom of queue 234 have been selected for execution.

A new Load instruction (Load RC←RA, RE) has been entered in the bottom of queue 208 that includes an operand (RA) that depends on the result from third complex instruction (IMUL RA←RA, RE) in queue 234. Since the load/store instruction depends on an instruction in complex integer execution queue 234, a SYNC instruction or indicator is entered in the next available entry in queue 234, and a SYNCTAG is set to point to the load instruction in load execution queue 208 in the corresponding entry for the Sync instruction in the queue 234. The Load instruction along with a SYNC Pending indicator is saved to load/store queue 208.

Figure 7:
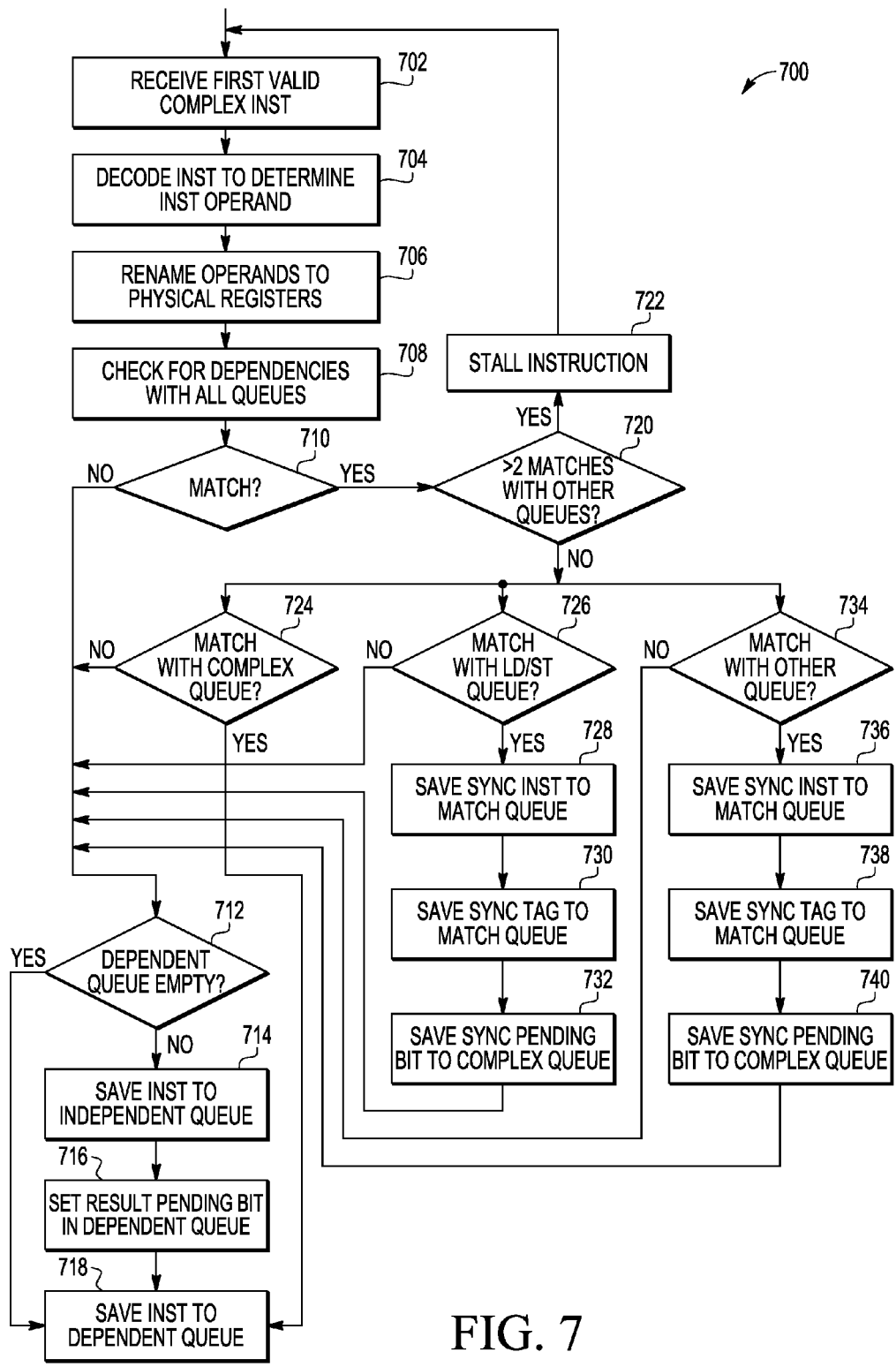
FIG. 7 is a flow diagram of an embodiment of a method for handling a first valid complex instruction in a decode/issue unit in the computer processor of FIG. 2.

FIG. 7 is a flow diagram of an embodiment of a method 700 for handling a first valid complex instruction in a decode/issue unit in the computer processor of FIG. 2, for example, the operation of decode/issue units 202, 252. Process 702 includes a decode/issue unit receiving a valid complex instruction. Process 704 includes decoding the instruction to determine the instruction operands. Process 706 includes renaming operands to physical registers. Process 708 includes checking for instruction dependencies with all execution queues. For example, process 708 can determine whether the operands of the received instruction depend on a second instruction stored in one of the execution queues as well as on a third instruction stored in another one of the execution queues.

Process 710 determines whether the received complex instruction depends on an instruction in another queue. If no dependent instructions are found, process 712 determines whether the dependent complex integer execution queue is empty. If the dependent complex integer execution queue is empty, process 718 saves the instruction to the dependent complex integer execution queue. If the dependent complex integer execution queue is not empty, process 714 includes saving the instruction to the independent complex instruction execution queue. Process 716 sets a result pending indicator in the dependent complex instruction execution queue, and process 718 saves the instruction to the dependent complex integer execution queue.

Returning to process 710, if the received instruction depends on at least one instruction in the other execution queues, process 720 determines whether the received complex instruction depends on more than two instructions in other execution queues. If the valid complex instruction depends on more than two instructions in other execution queues, process 722 stalls the complex instruction and returns to process 702.

If the valid complex instruction does not depend on more than two instructions in the execution queues in process 720, process 724 determines whether the received complex instruction depends on an instruction in one of the complex integer execution queues. If the received instruction depends on an instruction in one of the complex integer execution queues, process 718 saves the instruction to the dependent complex integer execution queue. If the received instruction does not depend on an instruction in one of the complex integer execution queues in process 724, control transitions to process 712.

Returning to process 720, if the valid complex instruction does not depend on more than two instructions in the execution queues in process 720, process 726 determines whether the valid complex instruction received in process 702 depends on (or matches) one of the instructions in a load/store queue. If the valid complex instruction does not depend on one of the instructions in a load/store queue, process 726 transitions to process 712. Otherwise, if the valid complex instruction does depend on an instruction in a load/store queue, process 728 saves or inserts a SYNC instruction in the load/store queue that includes the matching instruction and process 730 sets a SYNCTAG for the SYNC instruction in the load/store queue that includes the matching instruction. The SYNCTAG points to the complex instruction in the complex queue. Process 732 saves a SYNC Pending indicator to the complex queue containing the valid complex instruction. Control then passes to process 712.

Returning again to process 720, if the valid complex instruction does not depend on more than two instructions in the execution queues in process 720, process 734 determines whether the valid complex instruction received in process 702 depends on (or matches) one of the instructions in another queue. If the valid complex instruction does not depend on one of the instructions in another queue, process 734 transitions to process 712. Otherwise, if the valid complex instruction does depend on an instruction in another queue, process 736 saves or inserts a SYNC instruction in the queue that includes the matching instruction and process 738 sets a SYNCTAG for the SYNC instruction in the queue that includes the matching instruction. The SYNCTAG points to the complex instruction in the complex queue. Process 740 saves a SYNC Pending indicator to the complex queue containing the valid complex instruction. Control then passes to process 712.

Figure 8:
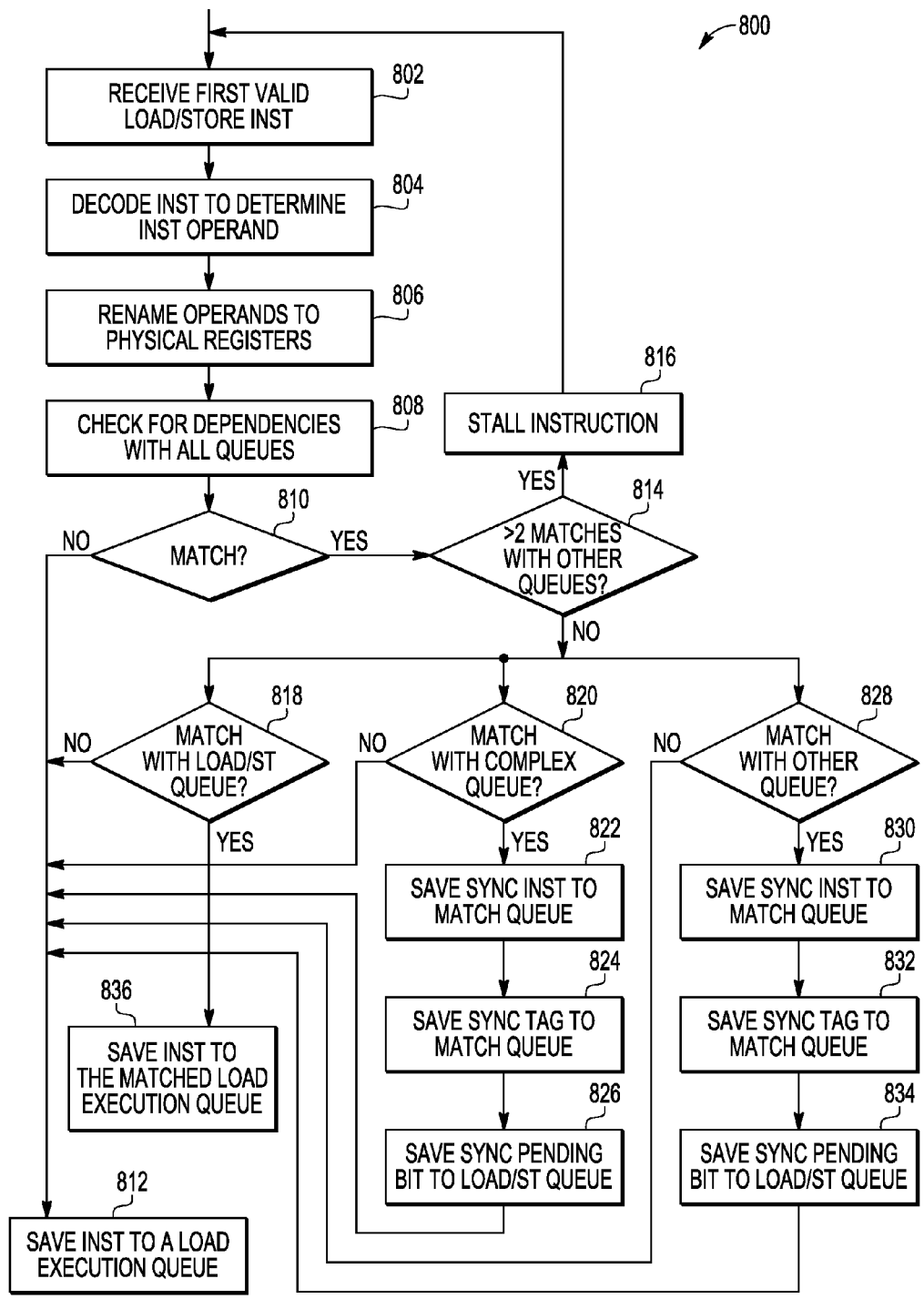
FIG. 8 is a flow diagram of an embodiment of a method for handling a first valid load/store instruction in a decode/issue unit in the computer processor of FIG. 2.

FIG. 8 is a flow diagram of an embodiment of a method 800 for handling a first valid load/store instruction in a decode/issue unit in the computer processor of FIG. 2, for example, the operation of decode/issue units 202, 252. Process 802 includes a decode/issue unit receiving a valid load/store instruction. Process 804 includes decoding the instruction to determine the instruction operands. Process 806 includes renaming operands to physical registers. Process 808 includes checking for instruction dependencies with all execution queues. For example, process 808 can determine whether the operands of the received instruction depend on a second instruction stored in one of the execution queues as well as on a third instruction stored in another one of the execution queues.

Process 810 determines whether the received valid load/store instruction depends on an instruction in another queue. If no dependent instructions are found, process 812 saves the instruction to a load/store execution queue.

Returning to process 810, if there is at least one match between the received load/store instruction and an instruction in one of the other execution queues, process 814 determines whether the received load/store instruction depends on more than two instructions in other execution queues. If the valid load/store instruction depends on more than two instructions in the execution queues, process 816 stalls the load/store instruction and returns to process 802.

If the valid load/store instruction does not depend on more than two instructions in the execution queues in process 814, process 818 determines whether the received load/store instruction depends on an instruction in one of the load/store queues. If the received load/store instruction depends on an instruction in one of the load/store queues, process 836 saves the instruction to the matched load execution queue. If the received load/store instruction does not depend on an instruction in one of the load/store queues in process 818, control transitions to process 812.

Returning to process 814, if the valid load/store instruction does not depend on more than two instructions in the execution queues in process 814, process 820 determines whether the valid load/store instruction received in process 802 depends on (or matches) one of the instructions in a complex integer execution queue. If the valid load/store instruction does not depend on one of the instructions in a complex integer execution queue, process 820 transitions to process 812. Otherwise, if the valid load/store instruction does depend on an instruction in a complex integer execution queue, process 822 saves or inserts a SYNC instruction in the complex integer execution queue that includes the matching instruction and process 824 sets a SYNCTAG in the corresponding entry for the instruction in the complex integer execution queue that includes the matching instruction. The SYNCTAG points to the complex instruction in the complex queue. Process 826 saves a SYNC Pending indicator to the load/store queue containing the valid load/store instruction. Control then passes to process 812.

Returning again to process 814, if the valid load/store instruction received in process 802 does not depend on more than two instructions in the execution queues in process 814, process 828 determines whether the valid load/store instruction depends on (or matches) an instructions in another queue. If the valid load/store instruction does not depend on one of the instructions in another queue, process 828 transitions to process 812. Otherwise, if the valid load/store instruction does depend on an instruction in another queue, process 830 saves or inserts a SYNC instruction in the queue that includes the matching instruction and process 832 sets a SYNCTAG for the SYNC instruction in the queue that includes the matching instruction. The SYNCTAG points to the complex instruction in the complex queue. Process 834 saves a SYNC Pending indicator to the load/store queue containing the valid load/store instruction. Control then passes to process 812.

Figure 9:
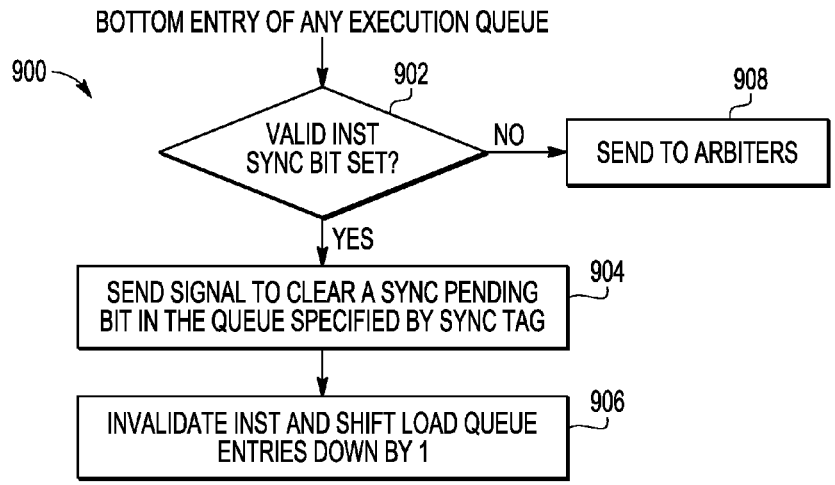
FIG. 9 is a flow diagram of an embodiment of a method for handling bottom entries in execution queues in the computer processor of FIG. 2.

FIG. 9 is a flow diagram of an embodiment of a method 900 for handling bottom entries in execution queues in the computer processor 102 of FIG. 2, for example, using issue/decode units 202, 252. Process 902 includes determining whether a SYNC indicator is set for a valid instruction at the bottom of an execution queue. If the SYNC indicator is not set, process 908 includes sending the valid instruction to an arbiter that corresponds to the execution queue. If the SYNC indicator is set, process 904 includes sending a signal to clear a SYNC Pending indicator in the queue specified by a corresponding SYNCTAG. Process 906 includes invalidating the instruction at the bottom of the queue and shifting the load queue entries down by one space in the queue.

Figure 10:
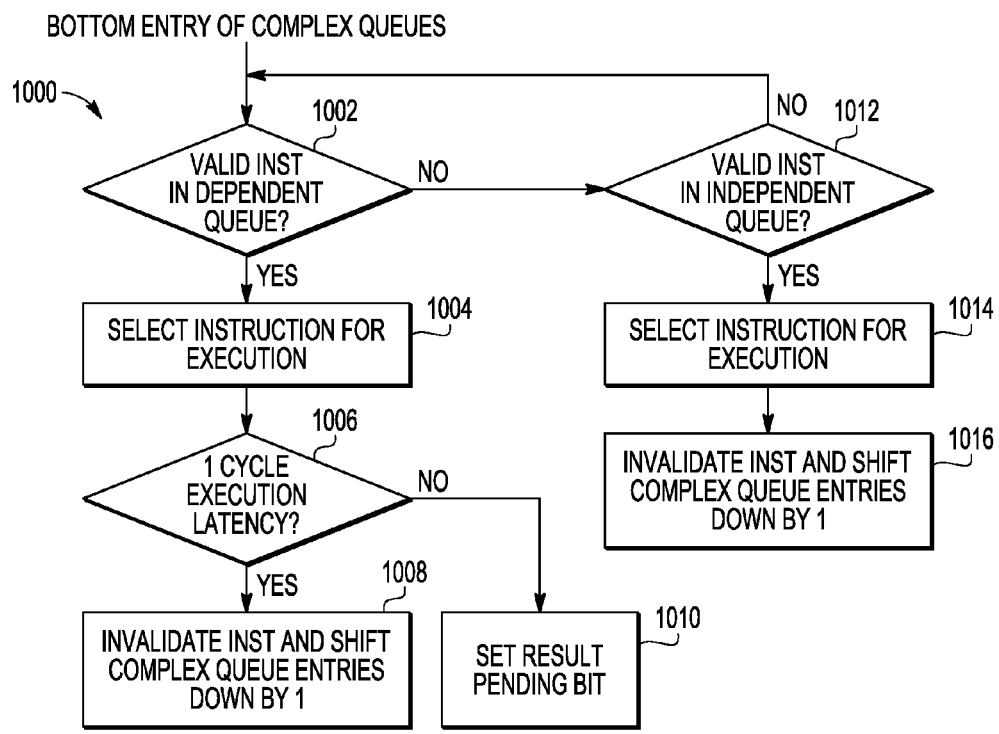
FIG. 10 is a flow diagram of an embodiment of a method for handling bottom entries in complex queues in the computer processor of FIG. 2.

FIG. 10 is a flow diagram of an embodiment of a method 1000 for handling bottom entries in complex integer execution queues 234, 236 in the computer processor 102 of FIG. 2. Process 1002 includes determining whether there is a valid instruction in the dependent complex integer execution queue. If there is a valid instruction in the dependent complex integer execution queue, process 1004 selects the instruction for execution. Process 1006 determines whether the instruction has an execution latency, for example, a latency of one cycle. If the instruction will complete in one cycle, process 1008 invalidates the instruction and shifts the dependent complex integer execution queue entries down by one slot. If the instruction is determined not to have an execution latency in process 1006, process 1010 sets the Result Pending indicator for the instruction.

Returning to process 1002, if there is not a valid instruction in the dependent complex integer execution queue, process 1012 determines whether there is a valid instruction in the independent complex integer execution queue. If there is not a valid instruction in the independent complex integer execution queue, control transfers to process 1002. If there is a valid instruction in the independent complex integer execution queue, process 1014 selects the instruction for execution, and process 1016 invalidates the instruction and shifts the independent complex integer execution queue entries down by one slot.

By now it should be appreciated that processing systems and methods have been disclosed that can include an instruction unit 200 which provides instructions for execution by the processor; a decode/issue unit 202 which decodes instructions received from the instruction unit and issues the instructions; and a plurality of execution queues 208, 232, 234, 236 coupled to the decode/issue unit, wherein each issued instruction from the decode/issue unit is stored into an entry of at least one queue of the plurality of execution queues. The plurality of queues can comprise an independent execution queue; a dependent execution queue; and a plurality of execution units coupled to receive instructions for execution from the plurality of execution queues. The plurality of execution units can comprise a first execution unit, coupled to receive instructions from the dependent execution queue and the independent execution queue which have been selected for execution. When a multi-cycle instruction at a bottom entry of the dependent execution queue is selected for execution, it may not be removed from the dependent execution queue until a result is received from the first execution unit 1010. When a multi-cycle instruction at a bottom entry of the independent execution queue is selected for execution, it can be removed from the independent execution queue without waiting to receive a result from the first execution unit 1014, 1016.

In other aspects, the decode/issue unit is configured to, in response to receiving a multi-cycle pipelined instruction, decode the multi-cycle pipelined instruction and determine whether an operand of the multi-cycle pipelined instruction includes a dependency on any instruction in the plurality of execution queues 704, 708. When the decode/issue unit determines that an operand of the multi-cycle pipelined instruction includes a dependency on an instruction in the dependent execution queue, the multi-cycle pipelined instruction can be stored in a first entry of the dependent execution queue 724 "yes", 718.

In other aspects, the multi-cycle pipelined instruction can be further characterized as a complex integer instruction and the first execution unit can be further characterized as a complex integer instruction unit.

In other aspects, the decode/issue unit can be configured to, in response to receiving a multi-cycle pipelined instruction, decode the multi-cycle pipelined instruction and determine whether an operand of the multi-cycle pipelined instruction includes a dependency on any instruction in the plurality of execution queues 704, 708. When the decode/issue unit determines that an operand of the multi-cycle pipelined instruction does not include a dependency on an instruction in the dependent execution queue 724 "no", the multi-cycle pipelined instruction is stored in a first entry of the dependent execution queue 718 and selectively stored in a first entry of the independent execution queue 712, 714.

In other aspects, when the decode/issue unit determines that the dependent execution queue is empty 712 "yes", the multi-cycle pipelined instruction is not stored in the first entry of the independent execution queue 718, with bypass of 714.

In other aspects, when the decode/issue unit determines that an operand of the multi-cycle pipelined instruction does not include a dependency on an instruction in the dependent execution queue and the dependent execution queue is not empty 712 "no", the multi-cycle pipelined instruction is stored in the first entry of the independent execution queue 714.

In other aspects, when the multi-cycle pipelined instruction is stored in the independent execution queue, a result pending indicator for the multi-cycle pipelined instruction in the first entry is asserted 716 to indicate that it is waiting for result data from the first execution unit for the multi-cycle pipelined instruction provided to the first execution unit from the independent execution queue.

In other aspects, when a multi-cycle instruction at the bottom entry of the dependent execution queue is selected for execution by the first execution unit, a corresponding result pending bit for the multi-cycle instruction at the bottom entry of the dependent execution queue is asserted 1010 to indicate that it is waiting for result data from the first execution unit.

In other aspects, when a single-cycle instruction at a bottom entry of the dependent execution queue is selected for execution, it is immediately removed from the dependent execution queue upon selection for execution.

In other embodiments, in a processor having a decode/issue unit, an independent execution queue and a dependent execution queue, and an execution unit coupled receive instructions from each of the independent and dependent execution queues, a method comprises receiving a first multi-cycle pipelined instruction 702; decoding the first multi-cycle pipelined instruction by the decode/issue unit to determine operands of the first multi-cycle pipelined instruction 704; and determining whether an operand of the first multi-cycle pipelined instruction includes a dependency on any instruction stored in the dependent execution queue 708. When an operand of the first multi-cycle pipelined instruction includes a dependency on any instruction stored in the dependent execution queue, the first multi-cycle pipelined instruction is stored in a first entry of the dependent execution queue; and when an operand of the first multi-cycle pipelined instruction does not include a dependency on any instruction stored in the dependent execution queue, the method can comprise selectively storing the first multi-cycle pipelined instruction in a first entry of the independent execution queue based on whether or not the dependent execution queue is empty, and storing the first multi-cycle pipelined instruction in a first entry of the dependent execution queue.

In other aspects, the step of selectively storing the first multi-cycle pipelined instruction in a first entry of the independent execution queue comprises: storing the first multi-cycle pipelined instruction in the first entry of the independent execution queue when the dependent execution queue is not empty; and not storing the first multi-cycle pipelined instruction in the first entry of the independent execution queue when the dependent execution queue is empty.

In other aspects, when the first multi-cycle pipelined instruction is stored in the first entry of the independent execution queue, the method further comprises setting a result pending indicator for the first multi-cycle pipelined instruction in the first entry of the dependent execution queue to indicate that it is waiting for result data from the execution unit for the first multi-cycle pipelined instruction provided to the execution unit from the independent execution queue.

In other aspects, when a multi-cycle instruction reaches a bottom entry of the dependent execution queue and is selected for execution, the multi-cycle instruction are not removed from the dependent execution queue until a result is received from the execution unit 1010; and when a multi-cycle instruction reaches a bottom entry of the independent execution queue and is selected for execution, the multi-cycle instruction is removed from the independent execution queue without waiting to receive a result from the execution unit 1014, 1016.

In other aspects, the processor has a load/store execution queue, and a load/store execution unit, the method further comprises determining that an operand of the first multi-cycle pipelined instruction includes a dependency on a load instruction in a first entry of the load/store execution queue. A synchronization indicator is set corresponding to the first multi-cycle pipelined instruction in a second entry of the load/store execution queue which is immediately adjacent the first entry of the load/store execution queue to indicate that the first multi-cycle pipelined instruction is stored in the dependent or independent execution queue and to indicate a location of the stored first multi-cycle pipelined instruction.

In other aspects, a synchronization pending indicator 732 for the first multi-cycle pipelined instruction is set in the first entry of the independent execution queue to indicate that the first multi-cycle pipelined instruction has a corresponding synchronization indicator stored in another execution queue.

In other aspects, after the load instruction reaches a bottom entry of the load/store execution queue and is selected for execution, the load instruction is removed from the load/store execution queue when a result is received for the load instruction. After the load instruction is removed from the load/store execution queue, the synchronization indicator for the first multi-cycle pipelined instruction reaches the bottom entry of the load/store execution queue. When the synchronization indicator for the first multi-cycle pipelined instruction is at the bottom entry of the load/store execution queue, a synchronization clear indicator 904 is provided to clear the synchronization pending indicator in the first entry of the independent execution queue to indicate that the first multi-cycle pipelined instruction is ready for selection for execution.

In other aspects, after providing the synchronization clear indicator, the synchronization indicator can be removed from the bottom entry of the load/store execution queue.

In other embodiments, in a processor having a decode/issue unit, an independent execution queue and a dependent execution queue, and an execution unit coupled to receive multi-cycle pipelined instructions from each of the independent and dependent execution queues, a method comprises receiving a first multi-cycle pipelined instruction 702; decoding the first multi-cycle pipelined instruction by the decode/issue unit to determine operands of the first multi-cycle pipelined instruction 704; and determining whether an operand of the first multi-cycle pipelined instruction includes a dependency on any instruction stored in the dependent execution queue 708. When an operand of the first multi-cycle pipelined instruction does not include a dependency on any instruction stored in the dependent execution queue, determining whether the dependent queue is empty, and if the dependent queue is empty, storing the first multi-cycle pipelined instruction in a first entry of the dependent execution queue, and if the dependent queue is not empty, storing the first multi-cycle pipelined instruction in a first entry of the dependent execution queue and in a first entry of the independent execution queue, and setting a result pending indicator for the first multi-cycle pipelined instruction in the first entry of the dependent execution queue to indicate that it is waiting for result data; and when an operand of the first multi-cycle pipelined instruction includes a dependency on any instruction stored in the dependent execution queue, storing the first multi-cycle pipelined instruction in a first entry of the dependent execution queue.

In other aspects, when a multi-cycle instruction reaches a bottom entry of the dependent execution queue and is selected for execution, the multi-cycle instruction is not removed from the dependent execution queue until a result is received from the execution unit 1010; and when a multi-cycle instruction reaches a bottom entry of the independent execution queue and is selected for execution, the multi-cycle instruction is removed from the independent execution queue without waiting to receive a result from the execution unit 1014, 1016.

In other aspects, the processor has a load/store execution queue, and a load/store execution unit, the method further comprises determining that an operand of the first multi-cycle pipelined instruction includes a dependency on a load instruction in a first entry of the load/store execution queue; and setting a synchronization indicator corresponding to the first multi-cycle pipelined instruction in a second entry of the load/store execution queue which is immediately adjacent the first entry of the load/store execution queue to indicate that the first multi-cycle pipelined instruction is stored in the dependent or independent execution queue and to indicate a location of the stored first multi-cycle pipelined instruction.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and FIG. 2 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processor, comprising:
   an instruction unit which provides instructions for execution by the processor;
   a decode/issue unit which decodes instructions received from the instruction unit and issues the instructions; and
   a plurality of execution queues coupled to the decode/issue unit, wherein each issued instruction from the decode/issue unit is stored into an entry of at least one queue of the plurality of execution queues, wherein the plurality of queues comprises:
   an independent execution queue; and
   a dependent execution queue; and
   a plurality of execution units coupled to receive instructions for execution from the plurality of execution queues, wherein the plurality of execution units comprises:
   a first execution unit, coupled to receive instructions from the dependent execution queue and the independent execution queue which have been selected for execution;
   wherein:
   when a multi-cycle instruction at a bottom entry of the dependent execution queue is selected for execution, it is not removed from the dependent execution queue until a result is received from the first execution unit, and when a multi-cycle instruction at a bottom entry of the independent execution queue is selected for execution, it is removed from the independent execution queue without waiting to receive a result from the first execution unit wherein the decode/issue unit is configured to, in response to receiving a multi-cycle pipelined instruction, decode the multi-cycle pipelined instruction and determine whether an operand of the multi-cycle pipelined instruction includes a dependency on any instruction in the plurality of execution queues, wherein:

when the decode/issue unit determines that an operand of the multi-cycle pipelined instruction does not include a dependency on an instruction in the dependent execution queue, the multi-cycle pipelined instruction is stored in a first entry of the dependent execution queue and selectively stored in a first entry of the independent execution queue.

2. The processor of claim 1, wherein the decode/issue unit is configured to, in response to receiving a multi-cycle pipelined instruction, decode the multi-cycle pipelined instruction and determine whether an operand of the multi-cycle pipelined instruction includes a dependency on any instruction in the plurality of execution queues, wherein:

when the decode/issue unit determines that an operand of the multi-cycle pipelined instruction includes a dependency on an instruction in the dependent execution queue, the multi-cycle pipelined instruction is stored in a first entry of the dependent execution queue.

3. The processor of claim 1, wherein the multi-cycle pipelined instruction is further characterized as a complex integer instruction and the first execution unit is further characterized as a complex integer instruction unit.

4. The processor of claim 1, wherein when the decode/issue unit determines that the dependent execution queue is empty, the multi-cycle pipelined instruction is not stored in the first entry of the independent execution queue.

5. The processor of claim 1, wherein when the decode/issue unit determines that an operand of the multi-cycle pipelined instruction does not include a dependency on an instruction in the dependent execution queue and the dependent execution queue is not empty, the multi-cycle pipelined instruction is stored in the first entry of the independent execution queue.

6. The processor of claim 5, wherein when the multi-cycle pipelined instruction is stored in the independent execution queue, a result pending indicator for the multi-cycle pipelined instruction in the first entry is asserted to indicate that it is waiting for result data from the first execution unit for the multi-cycle pipelined instruction provided to the first execution unit from the independent execution queue.

7. The processor of claim 1, wherein when a multi-cycle instruction at the bottom entry of the dependent execution queue is selected for execution by the first execution unit, a corresponding result pending bit for the multi-cycle instruction at the bottom entry of the dependent execution queue is asserted to indicate that it is waiting for result data from the first execution unit.

8. The processor of claim 1, wherein when a single-cycle instruction at a bottom entry of the dependent execution queue is selected for execution, it is immediately removed from the dependent execution queue upon selection for execution.

9. In a processor having a decode/issue unit, an independent execution queue and a dependent execution queue, and an execution unit coupled to receive instructions from each of the independent and dependent execution queues, a method comprising:

receiving a first multi-cycle pipelined instruction;

decoding the first multi-cycle pipelined instruction by the decode/issue unit to determine operands of the first multi-cycle pipelined instruction;

determining whether an operand of the first multi-cycle pipelined instruction includes a dependency on any instruction stored in the dependent execution queue;

when an operand of the first multi-cycle pipelined instruction includes a dependency on any instruction stored in the dependent execution queue, storing the first multi-cycle pipelined instruction in a first entry of the dependent execution queue; and when an operand of the first multi-cycle pipelined instruction does not include a dependency on any instruction stored in the dependent execution queue, the method comprises:

selectively storing the first multi-cycle pipelined instruction in a first entry of the independent execution queue based on whether or not the dependent execution queue is empty; and storing the first multi-cycle pipelined instruction in a first entry of the dependent execution queue.

10. The method of claim 9, wherein the step of selectively storing the first multi-cycle pipelined instruction in a first entry of the independent execution queue comprises:

storing the first multi-cycle pipelined instruction in the first entry of the independent execution queue when the dependent execution queue is not empty; and not storing the first multi-cycle pipelined instruction in the first entry of the independent execution queue when the dependent execution queue is empty.

11. The method of claim 10, wherein when the first multi-cycle pipelined instruction is stored in the first entry of the independent execution queue, the method further comprises:

setting a result pending indicator for the first multi-cycle pipelined instruction in the first entry of the dependent execution queue to indicate that it is waiting for result data from the execution unit for the first multi-cycle pipelined instruction provided to the execution unit from the independent execution queue.

12. The method of claim 9, further comprising:

when a multi-cycle instruction reaches a bottom entry of the dependent execution queue and is selected for execution, not removing the multi-cycle instruction from the dependent execution queue until a result is received from the execution unit; and when a multi-cycle instruction reaches a bottom entry of the independent execution queue and is selected for execution, removing the multi-cycle instruction from the independent execution queue without waiting to receive a result from the execution unit.

13. The method of claim 9, wherein the processor has a load/store execution queue, and a load/store execution unit, the method further comprising:

determining that an operand of the first multi-cycle pipelined instruction includes a dependency on a load instruction in a first entry of the load/store execution queue;

setting a synchronization indicator corresponding to the first multi-cycle pipelined instruction in a second entry of the load/store execution queue which is immediately adjacent the first entry of the load/store execution queue to indicate that the first multi-cycle pipelined instruction is stored in the dependent or independent execution queue and to indicate a location of the stored first multi-cycle pipelined instruction.

14. The method of claim 13, further comprising:
setting a synchronization pending indicator for the first multi-cycle pipelined instruction in the first entry of the independent execution queue to indicate that the first multi-cycle pipelined instruction has a corresponding synchronization indicator stored in another execution queue.

15. The method of claim 14, further comprising:
after the load instruction reaches a bottom entry of the load/store execution queue and is selected for execution, removing the load instruction from the load/store execution queue when a result is received for the load instruction, wherein, after the load instruction is removed from the load/store execution queue, the synchronization indicator for the first multi-cycle pipelined instruction reaches the bottom entry of the load/store execution queue; and
when the synchronization indicator for the first multi-cycle pipelined instruction is at the bottom entry of the load/store execution queue, providing a synchronization clear indicator to clear the synchronization pending indicator in the first entry of the independent execution queue to indicate that the first multi-cycle pipelined instruction is ready for selection for execution.

16. The method of claim 15, further comprising:
after providing the synchronization clear indicator, removing the synchronization indicator from the bottom entry of the load/store execution queue.

17. In a processor having a decode/issue unit, an independent execution queue and a dependent execution queue, and an execution unit coupled to receive multi-cycle pipelined instructions from each of the independent and dependent execution queues, a method comprising:
receiving a first multi-cycle pipelined instruction;
decoding the first multi-cycle pipelined instruction by the decode/issue unit to determine operands of the first multi-cycle pipelined instruction;
determining whether an operand of the first multi-cycle pipelined instruction includes a dependency on any instruction stored in the dependent execution queue;
when an operand of the first multi-cycle pipelined instruction does not include a dependency on any instruction stored in the dependent execution queue, determining whether the dependent execution queue is empty, and when the dependent execution queue is empty, storing the first multi-cycle pipelined instruction in a first entry of the dependent execution queue, and when the dependent execution queue is not empty, storing the first multi-cycle pipelined instruction in a first entry of the dependent execution queue and in a first entry of the independent execution queue, and setting a result pending indicator for the first multi-cycle pipelined instruction in the first entry of the dependent execution queue to indicate that it is waiting for result data; and
when an operand of the first multi-cycle pipelined instruction includes a dependency on any instruction stored in the dependent execution queue, storing the first multi-cycle pipelined instruction in a first entry of the dependent execution queue.

18. The method of claim 17, further comprising:
when a multi-cycle instruction reaches a bottom entry of the dependent execution queue and is selected for execution, not removing the multi-cycle instruction from the dependent execution queue until a result is received from the execution unit; and
when a multi-cycle instruction reaches a bottom entry of the independent execution queue and is selected for execution, removing the multi-cycle instruction from the independent execution queue without waiting to receive a result from the execution unit.

19. The method of claim 17, wherein the processor has a load/store execution queue, and a load/store execution unit, the method further comprising:
determining that an operand of the first multi-cycle pipelined instruction includes a dependency on a load instruction in a first entry of the load/store execution queue;
setting a synchronization indicator corresponding to the first multi-cycle pipelined instruction in a second entry of the load/store execution queue which is immediately adjacent the first entry of the load/store execution queue to indicate that the first multi-cycle pipelined instruction is stored in the dependent or independent execution queue and to indicate a location of the stored first multi-cycle pipelined instruction.

\* \* \* \* \*

UNITED STATES PATENT AND TRADEMARK OFFICE
CERTIFICATE OF CORRECTION

| | | |
|---|---|---|
| PATENT NO. | : 8,966,229 B2 | Page 1 of 1 |
| APPLICATION NO. | : 13/212420 | |
| DATED | : February 24, 2015 | |
| INVENTOR(S) | : Thang M. Tran et al. | |

It is certified that error appears in the above-identified patent and that said Letters Patent is hereby corrected as shown below:

Claims

Column 15, line 8, Claim 1, change "execution unit" to be --execution unit;--

Signed and Sealed this
Twenty-second Day of March, 2016

Michelle K. Lee
*Director of the United States Patent and Trademark Office*